No. 824,043. PATENTED JUNE 19, 1906.
J. P. & G. B. SHEPPARD & A. J. MANKIN.
KNITTING MACHINE.
APPLICATION FILED APR. 26, 1905.
3 SHEETS—SHEET 3.
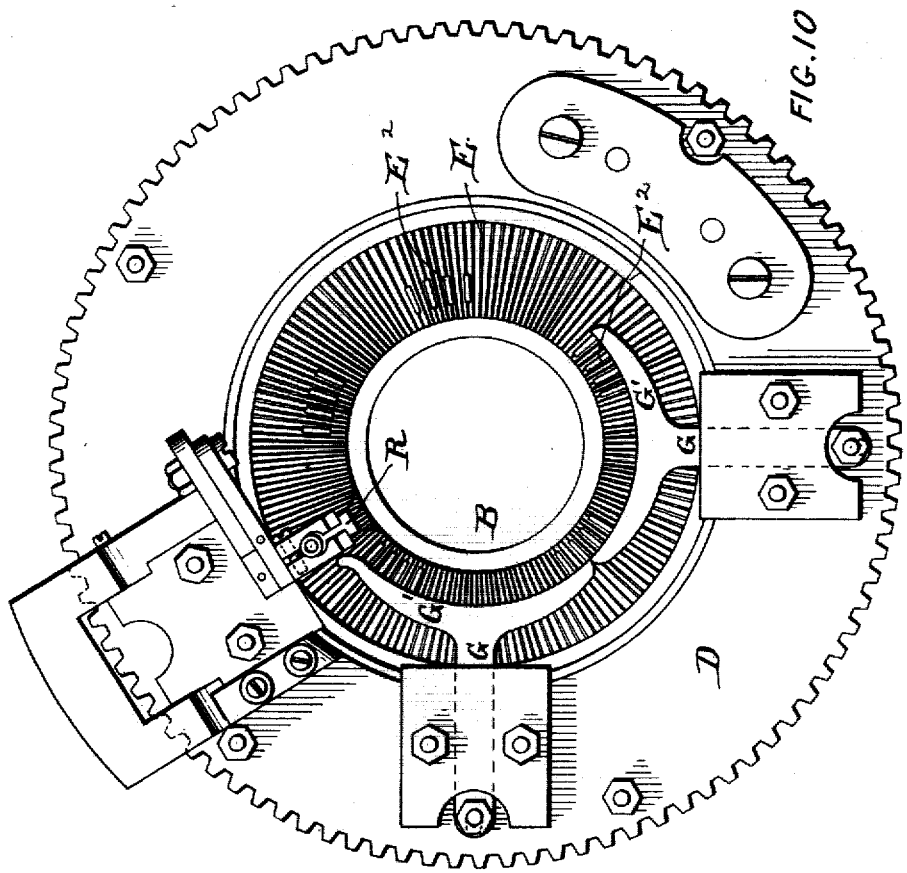

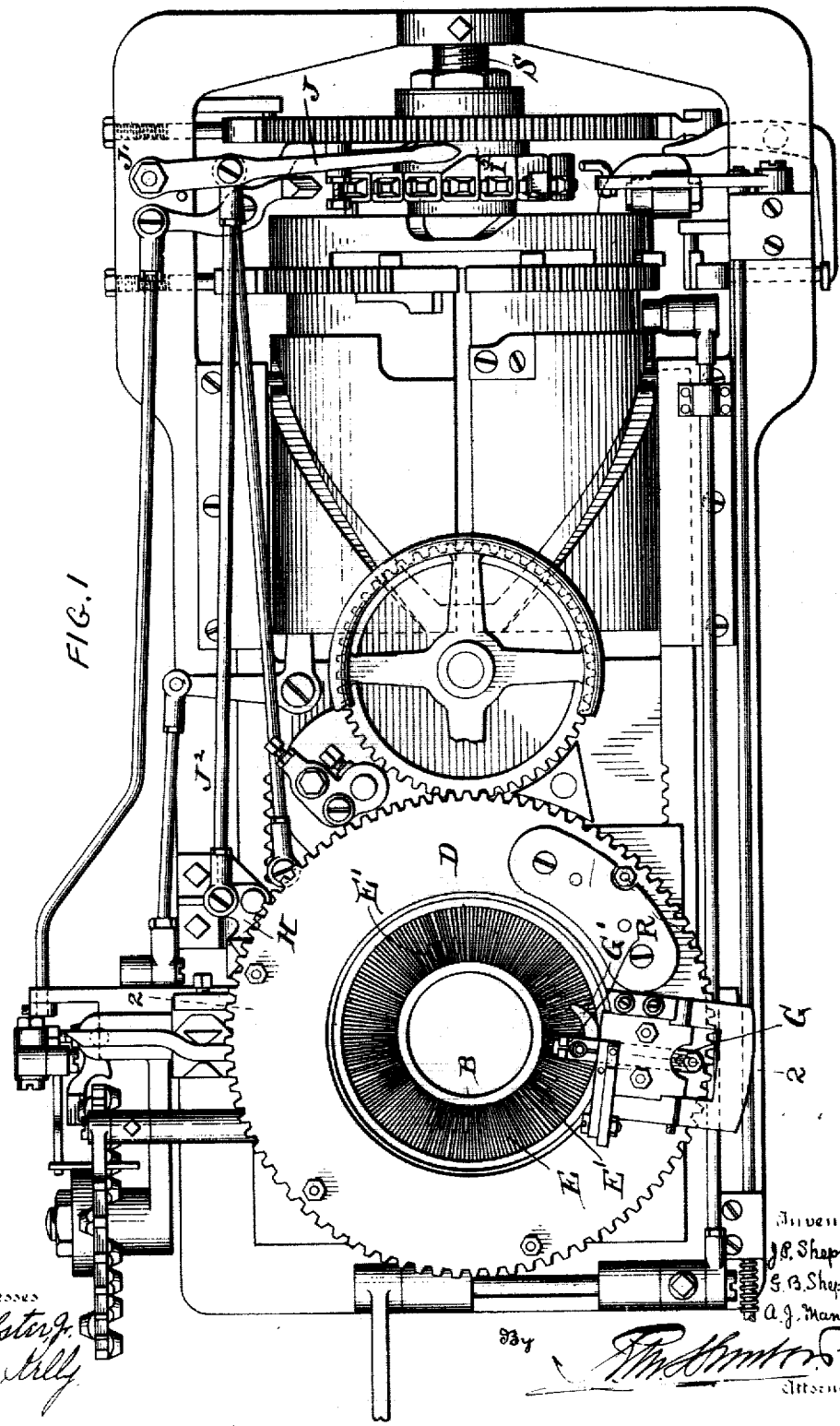

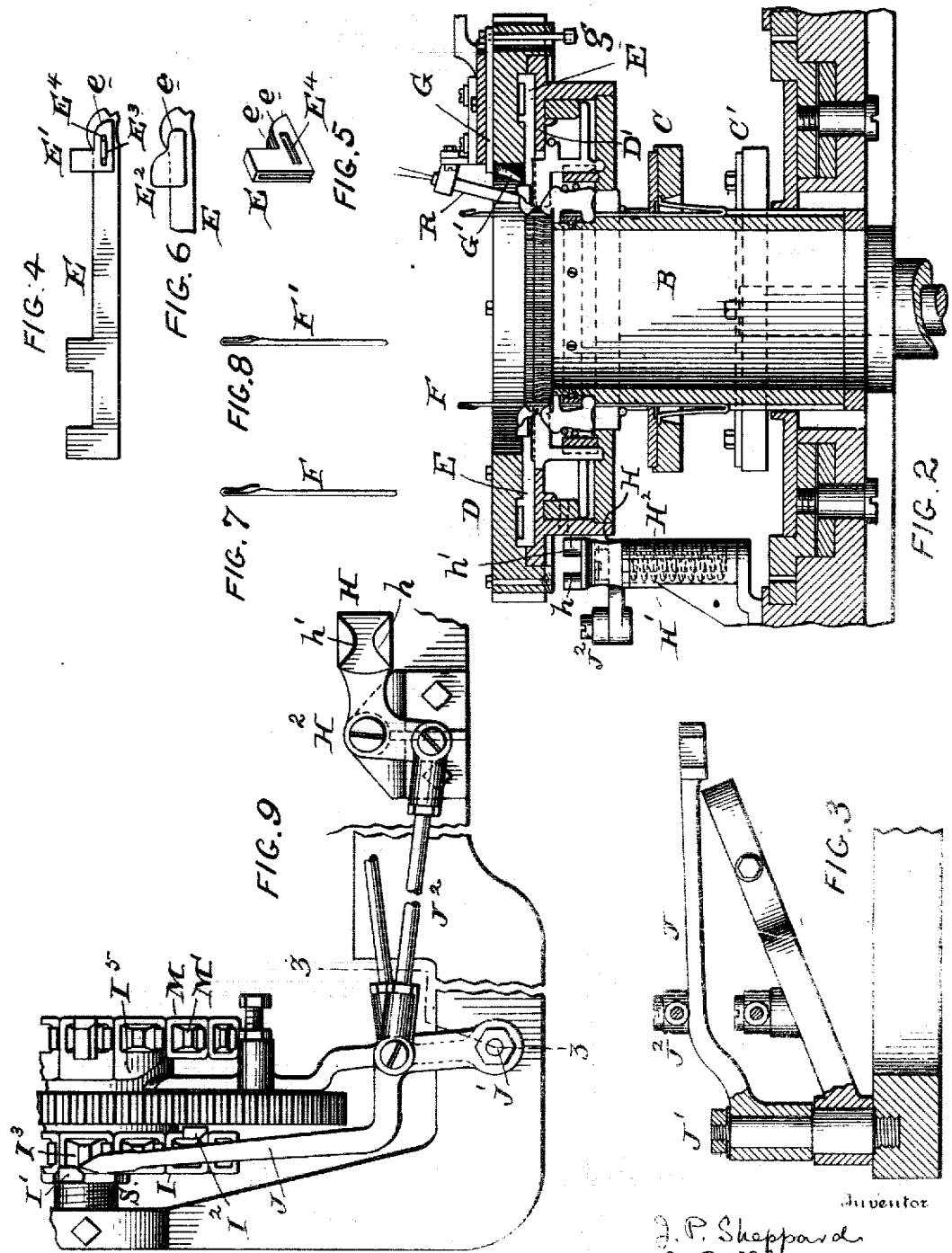

UNITED STATES PATENT OFFICE.

JOHN P. SHEPPARD, GEORGE B. SHEPPARD, AND ARTHUR J. MANKIN, OF SALEM, NEW JERSEY; SAID GEORGE B. SHEPPARD AND MANKIN ASSIGNORS TO SAID JOHN P. SHEPPARD.

KNITTING-MACHINE.

No. 824,043.     Specification of Letters Patent.     Patented June 19, 1906.

Application filed April 26, 1905. Serial No. 257,424.

*To all whom it may concern:*

Be it known that we, JOHN P. SHEPPARD, GEORGE B. SHEPPARD, and ARTHUR J. MANKIN, of Salem, county of Salem, and State of New Jersey, have invented an Improvement in Knitting-Machines, of which the following is a specification.

Our invention has reference to knitting-machines; and it consists of certain improvements which are fully set forth in the following specification and shown in the accompanying drawings, which form a part thereof.

Our invention has for its object the manufacture of lace stockings in which the lacework may be continued from the top down to the ankle both at front and back. While this has been accomplished upon specially-constructed machines of complicated structure for the manufacture of ladies or large sizes of stockings, our invention secures the same results by small additions to a well-known type of knitting-machine heretofore adapted to knit all sizes of stockings, except the very small sizes and with lacework down the front only. By the addition of our improvements this class of machine is given greater capacity than the more complicated machines above referred to, because it not only then has capacity for making large sizes of lace stockings, but small sizes as well.

Our invention, more specifically considered, is an improvement upon the type of knitting-machine described in the United States Letters Patent to E. J. Franck, No. 536,616, of April 2, 1895, No. 656,538, of August 21, 1900, and No. 671,995, of April 16, 1901, and No. 706,509, of August 12, 1902, to Bard, and to which reference is made for the general details and mode of operation of the machine in knitting stockings. It will be sufficient in describing our improvements to assume certain operations for the ordinary and well-known parts of the machines as disclosed in said Franck and Bard patents.

Our invention consists in providing certain of the sinkers with pads adapted to close the beards of certain of the needles designed to assist in the making of lacework at the time they are being reciprocated and combining therewith cam devices for operating the pads directly or through the sinkers themselves, said cam devices being thrown in and out of operation under the control of a pattern-chain.

Our invention also comprehends details of construction which, together with the features above specified, will be better understood by reference to the drawings, in which—

Figure 1 is a plan view of a knitting-machine having our improvements applied thereto. Fig. 2 is a cross-section of same on line 2 2. Fig. 3 is a sectional view of a portion of Fig. 9. Fig. 4 is a side elevation of one of the sinkers having our improved pad applied thereto. Fig. 5 is a perspective view of one of the pads removed. Fig. 6 shows the end of one of the sinkers with the pad secured rigidly thereto. Fig. 7 is an elevation of the knitting end of one of the needles. Fig. 8 is a similar end of one of the blind needles which may be used in knitting open-work. Fig. 9 is a plan view of a portion of one end of the machine, showing a modified pattern mechanism for operating the sinker-pads; and Fig. 10 is a plan view of needle-head with loose sinker-pads.

B is the needle-head and is stationary.

F represents the needles, which are of the bearded type, as shown in Fig. 7. These needles are arranged in two sets, each approximately extending half around the needle-cylinder. Each set is reciprocated by one of the lifter-frames C C', and they are reciprocated alternately in the well-known manner. One of these sets of needles is further under control of fashioning devices for throwing needles into or out of action for forming the heel and toe; but the details of that mechanism are not shown.

D' is the sinker-bed and is carried by the needle-head B, and D is the sinker-gear, rotating upon the sinker-bed and having cam-grooves for reciprocating the sinkers E away from the needle-shanks when the thread-guide is in the act of delivering the thread.

R is the thread-guide and rotates with the sinker-gear.

The foregoing parts are all well known and will not need any further description.

The sinker-bars in plain knitting do not affect the action of the beards; but for lace-knitting we provide them with pads E', having operating cam-surfaces *e e* extending down upon each side of the nose of the sinker, so as to project under the descending beards of the needles and close them, whereby instead of taking the thread under them the thread is caused to pass over the outside of the beard and fail to be knitted. In this manner there is formed open-work between two vertical rows of stitches separated by one or more rows, according to the arrangement of the sinkers having the pads. This is the novel part of our invention, because in machines of the class described no spaces or open-work between vertical rows of stitches can be allowed either by omitting needles or by using blind needles, as such would put the machine in condition in which it could not perform the plain or solid knitting, such as is necessary in knitting the heel and toe and the sole portion of the foot. In machines of the character referred to herein it has heretofore been possible to only make the lace or open-work upon the half of the needles which knit the front portion of the stocking and rely upon tuckwork or plain knitting at the back. By our employment of the sinker-pads we are enabled to make the needles act as blind needles whenever necessary and at the proper time cause them to again operate as needles for plain knitting.

Now while it is evident that in the case of the set of needles employed in knitting the front of the stocking certain needles may be omitted to form the open-work of the lace effect such effect would of necessity be required to be continued all the way down to the toe; but by employing ordinary needles with our improved sinker-pads the same result may be secured, and in addition thereto the lace effect may be stopped at any place desired, or solid knitting and lace effect may be alternately knitted down the stocking, and, if desired, this may be varied by employing tucked work alone in place of the solid knitting as an alternate effect for the lace. It will thus be seen that by the employment of our improvement a greater variety of effects may be produced, as well as securing the lace effect down the back. It will also be understood that though the open-work of the lace effect may be effected by omitting needles in the set which knit the front portion of the stocking it would produce a more satisfactory result to employ blind needles, such as shown in Fig. 8, where the design is to be uniform throughout the stocking, because the tension upon the yarn will be similar in such case to what would be the case with the needles operating with the pads to produce open-work in conjunction with the tuckwork in forming the lace effect at the back portion of the leg of the stocking. In this way the tensions would be uniform and the resulting lace effect at front and back would be identical.

Referring again to the pads E', we prefer to make them adjustable upon the sinkers, and this may be accomplished by making the pads in the form of loops, with the two legs fitting over the sinker-bar and guided thereon by lateral guides E³, received in horizontal slots E⁴ in the pads. This pad is pushed toward the needles by cams G', Fig. 10, and may be moved back by the beards of the needles when not otherwise prevented. The nose of the sinker enters between two needles F, and the cam-surfaces e e of the pad operate upon the beards of the needles, so that if both of the parts e are made long enough to act there will be open-work equal to the space occupied by two needles; but if only one of the cam-surfaces e be made operative then the open-work will occupy the space of one needle. It is a matter of option in the design whether the open-work shall be narrow by throwing one needle out of action or wide by throwing two needles out of action. If desired, the pad-cam can be rigid with the sinker, as shown in Fig. 6, in which case the sinker as a whole will be moved by cam G', as shown in Fig. 1. In this case the cam G' is not required to more than touch the pads as it passes them, the friction of the sinkers holding the pads up to the needles.

Each of the cams G' is secured to a reciprocating slide G, which is guided upon the top of the sinker-gear D and is provided on its outer end with a pin g, extending downward below the gear. As the gear rotates this pin g passes between the cam-surfaces h h' of the pivoted frame H, which is pivoted upon a standard H². This frame is oscillated in one direction by a spring H' and in the other direction by the rod J² and lever J, pivoted at J' and having its free end operated by cams I⁵ on the chain M, which is the chain employed to operate the usual fashioning mechanism—that is, put it into and out of operation. From this it will be seen that under the action of the cam I⁵ of the chain the cam-surface h' will be put into operative position to throw the pad-cam G' out of actuating position, and when permitted the spring H' oscillates the frame H in the opposite direction and brings the cam-surface h in operative position to force the cam G' forward to operate the pads E'. The time of operation of the pads E' by the cam G' is following the laying in of the thread, and consequently the cam G' follows the thread-guide R.

The chain M is rotated by a chain-wheel M' on the shaft S, which is intermittently rotated in the usual manner.

In place of employing the fashioning-chain M and the spring H' we may omit the spring and use an additional chain I, having cam-lugs I' and I² to operate upon the free end of the lever J to oscillate it at stated intervals, said chain being driven by the chain-wheel I⁵ on shaft S. This construction is clearly shown in Fig. 9. It is immaterial to our invention what means is employed to oscilliate the cam-frame H, as numerous devices may be employed for that purpose.

We have shown in Fig. 10 pad-cams G' extending half around the needle-cylinder, which may be used where the pads E' are adjustable on the sinker-bars, and we therefore do not limit ourselves to the employment of one pad-operating cam. It is evident that the pad-cams may be confined to the sinkers of the set of needles which knit the back half of the stocking, as there has been no difficulty in knitting continuous lacework at the front of the stocking. The pads may be supported and guided in any other suitable manner.

While we have shown our invention applied to the "Franck" and "Bard" types of knitting-machine, we do not restrict ourselves to any particular make of this class of machines, as our invention is applicable to all forms of knitting-machines employing vertically-reciprocating beard-needles, sinkers, and means for producing tuckwork thereon.

We do not confine ourselves to the details of construction, as these may be modified in various ways without departing from the spirit of our invention.

Having now described our invention, what we claim as new, and desire to secure by Letters Patent, is—

1. In a knitting-machine of the class described, the combination of a needle-cylinder, reciprocating needles therefor, a series of sinkers arranged annularly about said needle-head, cam mechanism for reciprocating the sinkers, means for producing tuck-stitches upon certain of the needles, sinker-pads greatly less in number than the series of sinkers distributed between certain of the sinkers so as to act only upon a portion of the needles to produce open-work, means for moving the sinker-pads into position to close the beards of the needles when descending, and means for feeding the yarn to the needles.

2. In a knitting-machine of the class described, the combination of a needle-cylinder, reciprocating needles therefor, a series of sinkers arranged annularly about said needle-head, cam mechanism for reciprocating the sinkers, means for producing tuck-stitches upon certain of the needles, sinker-pads greatly less in number than the series of sinkers distributed between certain of the sinkers so as to act only upon a portion of the needles to produce open-work, rotating cam means for moving the sinker-pads into position to close the beards of the needles when descending, pattern mechanism for moving the sinker-pad-operating cam into or out of operative position with respect to the sinker-pads whereby they may be operated only at certain times, and means for feeding the yarn to the needles.

3. In a knitting-machine of the class described, the combination of reciprocating beard-needles, with sinkers and sinker-pads, cam means for moving the sinker-pads into position for closing the beards of the needles as they are drawn down, pattern mechanism for controlling the time of action of the cam means for moving the sinker-pads, consisting of a pattern-chain, a lever operated by the chain, a cam-frame operated by the lever, and a connection operated by the cam-frame for moving the cam means which operates the sinker-pads, and means to feed yarn to the needles prior to their descent.

4. In a knitting-machine, a needle-cylinder, a series of vertically-reciprocating beard-needles in said cylinder, means for producing tuck-stitches upon the needles, sinkers for the needles, cam-pads between a portion of the sinkers each having an upwardly-extending shoulder and adapted to produce open-work, rotating cam devices acting upon the upwardly-extending shoulders to insure the pads being moved into the path of the beards of the descending needles, and a thread-guide to deliver thread to the needles, the position of the rotating cam being such that it operates the pads to close the beards at the time the needles would otherwise take the thread under their beards.

5. In a knitting-machine a reciprocating sinker combined with a cam-pad on its side to press in the beard of the needle and adjustably held upon and wholly supported by the sinker whereby it may be shifted toward or from the end of the sinker.

6. In a knitting-machine a sinker E having a transverse guide $E^3$, combined with a sinker-pad fitted over the top of the sinker-bar and having downwardly-extending sides provided with slotted portions $E^4$ to receive the guide $E^3$ and one or more cam portions $e$.

7. In a machine of the character described, beard-needles and a needle-cylinder for supporting them in a circle, means to reciprocate the needles, sinkers having sinker-pads for closing the beards of the needles, a rotating frame above the sinkers, and an adjustable cam carried thereby adapted to operate upon the sinker-pads to move them into position to close the beards of the needles as they descend.

8. In a machine of the character described, beard-needles and a needle-cylinder for supporting them in a circle, means to reciprocate the needles, sinkers arranged about the needles, sinker-pads for closing the beards of the needles arranged between a portion of the sinkers, a rotating frame above the sinkers, an adjustable cam carried thereby adapted to operate upon the sinker-pads to move them into position to close the beards of the needles as they descend, and pattern mechanism for controlling the adjustable cam for putting it into and out of operative position with respect to the sinker-pads.

9. In a machine of the class described, a series of reciprocating beard-needles arranged in a circle, combined with a series of radiating sinkers annularly arranged and having their ends extending between the needles, means for producing tuck-stitches upon the needles, a series of cam-pads greatly less in number than the number of sinkers and distributed at intervals between the sinkers so as to act only upon a portion of the needles to close their beards when the needles are drawn down to produce open-work, rotating cam devices to reciprocate the sinkers, and independent pattern-controlled rotating cam devices having an axis concentric with the circle of needles for operating the cam-pads at predetermined times.

10. In a machine of the class described, a circular row of beard-needles arranged in two sets one set having blind needles arranged at intervals among the ordinary needles, and the other set having ordinary needles, combined with sinkers for the needles, sinker-pads for a portion of the sinkers of the set of ordinary needles whereby the needles acted on thereby shall temporarily perform the function of blind needles and means for putting said pads into and out of operation at stated intervals.

11. In a knitting-machine of the class described, the combination of a series of beard-needles arranged in a circle, cam mechanism for reciprocating the needles, means for producing tuck-stitches upon the needles, sinkers arranged about the needles, a series of cam-pads greatly less in number than the sinkers supported by and movable independently of the sinkers and arranged in a plane about the outside of the needles to close the beards thereof and produce open-work, a traveling cam for moving the cam-pads into position for closing the beards of the needles as said needles are drawn down independently of the normal operation of the sinkers, and means to feed the yarn to the needles.

12. In a knitting-machine of the class described, the combination of a needle-cylinder having a series of reciprocating beard-needles, a series of sinkers arranged annularly about the needle-cylinder, an annular ring having cams for operating the sinkers, cam-pads arranged between and supported directly by a portion of the sinkers and having upward extensions projecting above the sinkers between the needle-cylinder and annular ring, cam devices for operating upon the extensions of the cam-pads for moving them into position for closing the beards of the needles when they are drawn down for making open-work, pattern mechanism for controlling the time of action of the cam devices which move the cam-pads, and means to feed yarn to the needles.

13. In a knitting-machine, a sinker combined with a sinker-pad formed of a U-shaped metal piece or saddle fitting over the upper edge of the sinker and forming a cam $e$ at its forward end and an upward extension above the sinker.

14. A sinker for a bearded-needle knitting-machine having sinker-pads arranged upon opposite sides near its end to act as cams to close the beards of the adjacent needles, said pads being supported by and adjustable on the sinker whereby they are movable toward or from the end of the sinker.

15. A sinker for a bearded-needle knitting-machine having sinker-pads arranged near its end and upon opposite sides adapted to close the beards of needles upon each side of the sinker, and shoulders upwardly extending above the sinker by which to operate the pads.

16. In a knitting-machine the combination of a needle-cylinder; two sets of needles therefor for respectively knitting the front of the stocking and the back, heel, sole and toe of the stocking each set comprising approximately one-half the needles; means for reciprocating the two sets of needles alternately; sinkers for said needles arranged in a circle about the needle-cylinder; means for operating the sinkers; means for producing tuck-stitches upon the needles; pads arranged between a portion only of sinkers of the half of the needles which are intended to knit the back, heel, sole and toe of the stocking for closing the beards of certain of the needles when drawn down so as to prevent them knitting and thereby produce open-work; pattern-controlled means for throwing said pads into operating position; and a thread-guide to feed a thread to the needles.

17. In a knitting-machine of the class described, a needle-cylinder, two sets of bearded needles for said cylinder, means for reciprocating said sets of needles alternately, means for feeding a thread to the needles, sinkers for assisting in ordinary or regular knitting, means for producing tuck-stitches upon the needles, means for producing open-work upon a portion of the needles, and pattern-controlled mechanism for controlling the time of action of the means for producing open-work upon the needles whereby lace-work effects may be formed in the knitted fabric at those parts only where desired.

18. In a machine of the class described, namely one having a needle-cylinder, two sets of bearded needles therefor arranged in a circle, means for reciprocating said sets alternately, means for knitting a heel and a toe upon one set of the needles, means for producing plain stitches upon all of the needles, and means for producing tuck-stitches upon a portion of the needles of each set, in combination with means for rendering other of the needles than those upon which tuck-stitches are made of either or both sets of needles inoperative so as to make open-work separately or associated with the tuck-stitches, and pattern mechanism for controlling the time of action of the means which render the needles inoperative when producing open-work.

19. In a machine of the class described, namely one having a needle-cylinder, two sets of bearded needles therefor arranged in a circle, means for reciprocating said sets alternately, means for knitting a heel and a toe upon one set of the needles, means for producing plain stitches upon all of the needles, and means for producing tuck-stitches upon a portion of the needles of each set, in combination with means for rendering other of the heel and toe needles than those upon which tuck-stitches are made inoperative so as to make open-work separately or associated with the tuck-stitches, and pattern mechanism for controlling the time of action of the means which render the needles inoperative when producing open-work.

In testimony of which invention we hereunto set our hands.

JOHN P. SHEPPARD.
GEORGE B. SHEPPARD.
ARTHUR J. MANKIN.

Witnesses:
D. HARRIS SMITH,
LOUIS A. WARD.